(12) United States Patent
Simal et al.

(10) Patent No.: US 7,465,767 B2
(45) Date of Patent: Dec. 16, 2008

(54) ADHESIVES

(75) Inventors: François Simal, Forest (BE); Harrell Tweedy, Acworth, GA (US); Steven Van Es, Liège (BE); Patrice Roose, St. Pieters Leeuw (BE)

(73) Assignee: Cytec Surface Specialties, S.A., Bruxelles (BE)

( * ) Notice: Subject to any disclaimer, the term of this patent is extended or adjusted under 35 U.S.C. 154(b) by 237 days.

(21) Appl. No.: 10/537,157

(22) PCT Filed: Dec. 19, 2003

(86) PCT No.: PCT/EP03/14658

§ 371 (c)(1),
(2), (4) Date: Jun. 22, 2005

(87) PCT Pub. No.: WO2004/056898

PCT Pub. Date: Jul. 8, 2004

(65) Prior Publication Data

US 2006/0074210 A1   Apr. 6, 2006

(30) Foreign Application Priority Data

Dec. 23, 2002   (EP) .................................. 02028900

(51) Int. Cl.
*C08F 293/00* (2006.01)
*C08F 20/10* (2006.01)

(52) U.S. Cl. ...................... 525/222; 525/227; 525/245; 523/201

(58) Field of Classification Search ................ 525/222, 525/227, 245; 523/201
See application file for complete search history.

(56) References Cited

U.S. PATENT DOCUMENTS

| 4,097,553 | A | * | 6/1978 | Novak ........................ 525/80 |
| 5,262,479 | A | * | 11/1993 | Tobing ........................ 525/71 |
| 5,399,620 | A | | 3/1995 | Niessner et al. |
| 5,721,330 | A | * | 2/1998 | Ma ........................ 526/318.41 |
| 5,756,585 | A | | 5/1998 | Teyssie et al. |
| 5,763,548 | A | | 6/1998 | Matyjaszewski et al. |
| 6,162,882 | A | | 12/2000 | Matyjaszewski et al. |
| 6,288,173 | B1 | | 9/2001 | Schimmel et al. |
| 6,310,175 | B1 | | 10/2001 | Kobayashi et al. |
| 6,326,116 | B2 | * | 12/2001 | Yuasa et al. ............. 430/110.1 |
| 6,395,836 | B1 | * | 5/2002 | Shinoda ..................... 525/222 |
| 6,534,229 | B2 | * | 3/2003 | Ohba et al. ............. 430/108.2 |
| 6,583,223 | B2 | * | 6/2003 | Goetz et al. ................... 525/88 |
| 7,211,625 | B2 | * | 5/2007 | Tsuji et al. ................... 525/93 |

FOREIGN PATENT DOCUMENTS

| EP | 0 243 120 | A | 10/1987 |
| WO | 86/00626 | A | 1/1986 |
| WO | 92/07014 | A | 4/1992 |
| WO | 00/39233 | A | 7/2000 |
| WO | 00/43344 | A | 7/2000 |

* cited by examiner

*Primary Examiner*—Randy Gulakowski
*Assistant Examiner*—Olga Asinovsky
(74) *Attorney, Agent, or Firm*—Wenderoth, Lind & Ponack, L.L.P.

(57) ABSTRACT

There are disclosed star shaped thermoplastic elastomers made of acrylic block copolymers obtained by transition metal catalysed radical polymerisation. The elastomers comprise core arms obtained from monomers or mixture of monomers, whose $T_g$ is from about −65° C. to about −20° C., and of shell arms obtained from monomers or mixture of monomers, whose $T_g$ is from about 70° C. to about 160° C. The core copolymer has a polydispersity of 2 or higher and the final copolymer has a polydispersity of from 3 to 10.

12 Claims, No Drawings

ADHESIVES

The present invention relates to branched acrylic polymers, processes for obtaining them and to their uses for example as adhesives (e.g. such as pressure sensitive adhesives (PSA) and/or hot melt adhesives). Particular embodiments of the branched acrylic polymers of the invention are star shaped thermoplastic elastomeric acrylic block copolymers obtained by radical polymerization for example using a transition metal catalyst. Such copolymers can be highly polydisperse and can comprise an inner core of polymer chain branches with low glass transition temperatures and an outer shell of polymer chain branches with high glass transition temperatures.

Polyacrylate adhesives emerged in the early 1960s as a valuable alternative to the rubber adhesives previously used. Polyacrylates exhibit many useful properties such as very good resistance to aging, good weather performance, and good adhesion to polar substrates. Acrylic monomers are reactive and highly versatile so can be polymerized under mild conditions to yield adhesive formulations which do not require any additional compounding.

To reduce emission of solvents solutions of acrylic polymers in organic solvents, have been gradually replaced for most uses with acrylic polymers dispersed in water as the continuous phase. However for some uses, such as waterborne adhesives, current water based acrylic emulsions are still unsatisfactory as for example they are moisture sensitive, require high processing energy, have insufficient adhesive performance, reduced dimensional stability and give poor resistance to shock and gasoline.

Warm or hot melt adhesives have some of the desired properties of solvent based adhesive with substantially less emission of volatile organic compounds (VOCs) as they are substantially solvent free. Hot-melt adhesives mostly comprise thermoplastic elastomers (TPE) comprising block copolymers, of typically three hydrocarbon segments (e.g. styrene-butadiene or isoprene-styrene). These tri-block copolymers are obtained by living anionic polymerization. TPEs have desirable properties such as high maximum elongation at break and high tensile strength. Radial structures of TPEs have been proposed to increase cohesive strength whilst lowering viscosity. TPEs also have various disadvantages. They must be synthesised under highly stringent conditions which limits the range of monomers and functionality that can be used. The upper temperature at which TPEs can be used is low. The presence of an unsaturated mid block in these polymers imparts poor resistance to oxidation and/or UV and leads to poor aging. It is expensive to hydrogenate the polymer to address this.

Conventional acrylate polymers are unsatisfactory when used as hot-melt adhesives. After cooling polyacrylates have a lower cohesive strength compared to conventional hot-melt adhesives and their viscosity is high.

UV-curable acrylate polymers have been used were the polymer is irradiated to form chemical cross-links to ensure sufficient cohesive strength. However despite some advantages UV-curable acrylic polymers exhibit other disadvantages. For example there can be a lack of consistency in the final adhesive due to curing. Only certain coat weights can be used. The UV curing process is slow and the raw materials are expensive. The requirement to be UV-curable limits the amount and type of other ingredients (such as tackifiers) which may be added to the formulation. Acrylic polymers adhere poorly to non-polar substrates and the scope for modifying a UV curable formulation and/or polymer to improve adhesion is also limited.

Although in theory high cohesive strength and good aging properties suitable for use as PSAs might be expected with fully cured acrylic polymers, this has not proved the case in practice. Synthesis of such acrylic block copolymers is very difficult if not impossible using conventional free radical polymerization. The more recent technique of controlled radical polymerization (CRP) reportedly can prepare well-defined acrylic block copolymers bearing functional groups such as hydroxyl and/or epoxy and under less stringent conditions than previous ionic polymerization methods. However even CRP prepared fully cured acrylic TPE tri- block copolymers continue to be unsatisfactory. They still show poor mechanical and rheological properties; are poor PSAs and are difficult to formulate with tackifiers.

As currently used CRP also has many constraints. For example it was thought highly pure monomers and solvents must be used under stringent conditions in a two stage process. In the first step the monomers for the low $T_g$ polymers are converted at about 90%. It has always been believed that any impurities in the resultant low $T_g$ polymer from his first stage would introduce substantial defects in the final product resulting in loss of properties. Many standard works on polymerisation confirm this conventional prejudice and require that the polymer must then be isolated and purified before use in the second step. This is expensive and difficult. The purified low $T_g$ polymer is then used in as second stage as a macro-initiator to polymerising further monomers to obtain the high $T_g$ polymer. The two stage process produces a final product with a narrow polydispersity and it was thought that for CRP the theoretical upper limit of the poly-dispersity of the final product was between 1.6 to 2.0 depending on the mechanism. The conventional belief was also that to achieve a good phase separation between the different blocks within an acrylic block copolymer it was necessary to use such a purified product of narrow poly-dispersity.

Thus for these reasons there has been a widespread belief in the art that 'fully' cured acrylic tri-block copolymers which have satisfactory performance for use in adhesives cannot be made by CRP but must be made by ionic polymerization such as living anionic polymerisation, notwithstanding the many significant disadvantages of this method. For example the poly-dispersity of polymers made by ionic polymerisation is typically less than 1.1 It was also believed that such acrylic copolymer TPEs would be less effective PSAs compared to well known triblock hydrocarbon-based copolymers.

Thus there is a significant technical prejudice against use of radical polymerisation to obtain acrylic TPE block copolymers which might be suitable for use as adhesives.

It is extremely surprising therefore that the applicant has discovered that a one pot polymerization process can be used without any intermediate purification of the low $T_g$ monomer to produce acrylic block copolymers which can be used as PSAs. Unlike the prior art polymers such copolymers of the invention are impure and have a higher polydispersity than has been thought suitable for uses such as PSA.

Some prior art documents will now be discussed.

EP 0243120 (Du Pont) describes polymers made by group transfer polymerisation (GTP). As indicated above these polymers will have a theoretical maximum polydispersity of 2.0.

U.S. Pat. No. 5,399,620 (BASF) describes a process for making block copolymer including star polymers which have a polydispersity of less than 2. The polymers are prepared by an uncontrolled free radical polymerisation and have a molecular weight of less than 100,000 daltons (see page 2, lines 39 to 40).

U.S. Pat. No. 6,288,173 (PPG Industries) describes polymers made by atom transfer radical polymerisation (ATRP). The silane transfer agent used, Is incompatible with functional (e.g. hydroxy) monomers and this reference also requires that one of the monomers which form the A or B blocks is an amine functional monomer. In contrast the copolymers of the present invention can comprise common functional groups and can made from common functional monomers.

U.S. Pat. No. 6,310,175 (Nippon Shokubai) describes star shaped block co-polymers. These are prepared by an conventional free radical polymerisation which is controlled by a central mercaptan chain transfer agent. The polymers have a hard core (high $T_g$) and a soft outer layer (low $T_g$) which is the opposite of the polymers of the present invention which have a soft core and hard shell.

WO 98/40415 (Carnegie Mellon University) discloses a controlled free radical polymerization process of atom or group transfer radical polymerization in which the polymerization is made in presence of an initiator, a transition metal in its zero oxidation state which forms a first transition metal compound that participates in a reversible redox cycle with the initiator and a ligand which coordinate in a sigma- or pi-bond to the transition metal. This process leads to different forms of block copolymers than those of the present invention.

WO 2000/39233 (3M) describes various hot-melt adhesives comprising tackifiers mixed with linear or radial acrylic block copolymers obtained by living anionic polymerization or by controlled radical polymerization. The copolymers are well-defined materials having a polydispersity lower than 2.0, and they have at least two A blocks and one B block. The adhesive compositions have a broad formulation latitude and adequate cohesive strength, without the need for a curing step.

WO 2000/43344 (Ciba) discloses branched polymers or copolymers prepared by atom transfer polymerization in the presence of an at least trifunctional alpha-halocarboxylic acid ester initiator and an oxidisable transition metal complex catalyst. When a copolymer containing two different monomers is made, it is done in two separate steps, with purification of the polymer obtained in the first step.

The applicant has unexpectedly discovered that certain branched acrylic polymers can be prepared easily and yet have advantageous properties useful to address some or all of the problems discussed herein Therefore broadly in accordance with the present invention there is provided a branched polymer comprising an acrylic copolymer having one or more core arm(s) comprising one or more core polymer(s) and one or more shell arm(s) comprising one or more shell polymer(s) and where said acrylic copolymer is obtained or obtainable by (an optionally transition metal catalysed) radical polymerization and has a polydispersity of from about 3 to about 10, and where (a) the or each core polymer(s) has a polydispersity of at least about 2 and a $T_g$ of from about −65° C. to about −20° C., and (b) the or each shell polymer(s) has a $T_g$ of from about 70° C. to about 160° C., The applicant has found acrylic star shaped block copolymers of the present invention may exhibit improved properties compared to simple chain polymers, for example improved heat resistance, unexpectedly high cohesive strength and/or low viscosity. The polymers of the invention may optionally be formulated with tackifiers to provide high performance adhesives and may also act as compatibilising agents to prepare formulations of two otherwise incompatible acrylic polymers.

In another aspect of the present invention there is provide a method for producing a branched polymer (such as those of the present invention) the method comprising the steps of:
(a) mixing (i) a polymerisation initiator (ii) one or more first acrylate polymer precursor(s); (iii) a ligand (optionally an amine); and (iv) an metal catalyst (optionally a transition metal salt and/or complex); to form a reaction mixture:
where at least one of the polymerisation initiator and/or first acrylate. polymer precursor(s) comprise at least three active functionalities capable of reacting to form polymeric core arms;
(b) polymerising the polymer precursor(s) in the reaction mixture until at least about 91% of the total weight of the polymer precursor(s) have been polymerised; to produce an acrylate polymer comprising polymeric core arms;
(c) adding to the reaction mixture, without any purification thereof, one or more second acrylate polymer precursor(s) capable of forming polymeric shell arms;
(d) polymerising the further polymer precursors to produce an acrylate copolymer comprising polymeric shell arms until: (i) at least about 95% of the total weight of the second polymer precursor(s) has been polymerised: and/or (ii) the $M_n$ of at least one of the arm(s) of the shell polymer reaches at least about 5 kilodaltons (preferably at least about 7 kilo-daltons);
(e) collecting and purifying the copolymer from the reaction mixture.

Preferably the method of the invention is performed in one reaction vessel without any intermediate purification or isolation steps.

In a further embodiment of the invention, there is provided an adhesive composition comprising a branched polymer of the invention and optionally from about 5 to about 150 phr of a tackifier, calculated by the weight of the polymer.

In addition to tackifiers polymers of the invention may be formulated with any other suitable ingredients for use as adhesives, such as PSA.

Adhesives of the present invention (which may be solvent based PSAs and/or hot-melt PSA without solvents) have been found to have cohesion as good as that of prior art stryene-isoprene-stryene (SIS) adhesives on stainless steel and have a good resistance to high temperature as measured by SAFT (shear adhesion failure test). The adhesives of the invention can also exhibit improved cohesion, adhesion and/or tack on non-polar surfaces such as polyethylene. Their elongation at break is more than 2500%. Their mechanical properties, such as a high strength at break and an high elongation at break, can easily be tuned by varying monomer nature and ratios.

A branched polymer is a polymer the molecules of which are branched chains; that is a chain with at least one branch point intermediate between the boundary units. A branch point is a point on a chain at which a branch is attached. A branch point from which 'n' linear chains emanate may be termed an 'n'-functional branch point, e.g. five-functional branch point. Alternatively, the terms trifunctional, tetrafunctional, pentafunctional, etc. may be used, e.g. pentafunctional branch point. A branch point in a network may be termed a junction point. A branch (or side chain or pendant chain) is an oligomeric or polymeric offshoot from a macromolecular chain. An oligomeric branch may be termed a short-chain branch. A polymeric branch may be termed a long-chain branch.

A polymer chain denotes the whole or part of a macromolecule, an oligomer molecule or a block, comprising a linear or branched sequence of constitutional units between two boundary constitutional units, each of which may be either an end group, a branch point or an otherwise-designated characteristic feature of the macromolecule. A cyclic macromolecule has no end groups but may nevertheless be regarded as a chain. Any number of branch points may be present between the boundary units.

Preferred branched polymers of the invention comprises dendritic polymers and/or star copolymers, more preferably star copolymers. A dendritic polymer denotes a polymer with a crystalline morphology produced by skeletal growth, leading to a 'treelike' appearance. A star copolymer denotes a copolymer where chains having different constitutional or configurational features are linked through a central moiety. Either dendritic polymers or star-shaped copolymer may be obtained from an initiator and/or polymer precursor which has at least a functionality of three, and preferably four or more.

Conveniently the branched polymers of the present invention are star-shaped thermoplastic elastomeric acrylic block copolymers. It is desired that copolymers of the present invention comprise an inner core of polymer arms of low $T_g$ and an outer shell of polymer arms of high $T_g$.

To make a star shaped copolymer a multi-functional polymerisation initiator of a star-shape may be used. Without wishing to be bound by any mechanism it is believed that due to coupling of radicals, the arms of the star may become branched when polymerisation proceeds. Alternatively, star-shaped structures can be obtained using a monofunctional initiator with a mixture of multifunctional (meth)acrylates such as tri- or tetra-acrylates.

The large elastomer and/or copolymer chain(s) of the invention may comprise distinct regions therein for example A/B type blocks in a block copolymer and/or distinct regions of core or shell arms in a star polymer. It will be understood that the $T_g$ of such sub-sections or portions of, a larger polymer may be incapable of being measured separately from the $T_g$ of the whole polymer. In such cases the $T_g$ of such sub-sections described herein refers to the $T_g$ of the corresponding homopolymer or co polymer which can be obtained or is obtainable from polymerising those polymer percursor(s) and/or mixture(s) of polymer percursor(s) which can form the repeat unit(s) for that sub section of the polymer.

Preferably, the core polymer has a $T_g$ from about −50 to about −30° C.

Preferably, the shell polymer has a $T_g$ from about 100 to about 150° C.

Polymers of the present invention may be prepared by one or more suitable polymer precursor(s) which may be organic and/or inorganic and comprise any suitable (co)monomer(s), (co)polymer(s) [including homopolymer(s)] and mixtures thereof which comprise moieties which are capable of forming a bond with the or each polymer precursor(s) to provide chain extension and/or cross-linking with another of the or each polymer precursor(s) via direct bond(s) as indicated herein.

Polymer precursors of the invention may comprise one or more monomer(s), oligomer(s), polymer(s); mixtures thereof and/or combinations thereof which have suitable polymerisable functionality.

A monomer is a substantially monodisperse compound of a low molecular weight (for example less than one thousand daltons) which is capable of being polymerised.

A polymer is a polydisperse mixture of macromolecules of large molecular weight (for example many thousands of daltons) prepared by a polymerisation method, where the macromolecules comprises the multiple repetition of smaller units (which may themselves be monomers, oligomers and/or polymers) and where (unless properties are critically dependent on fine details of the molecular structure) the addition or removal one or a few of the units has a negligible effect on the properties of the macromolecule.

A oligomer is a polydisperse mixture of molecules having an intermediate molecular weight between a monomer and polymer, the molecules comprising a small plurality of monomer units the removal of one or a few of which would significantly vary the properties of the molecule.

Depending on the context the term polymer may or may not encompass oligomer.

The polymer precursor of and/or used in the invention may be prepared by direct synthesis or (if the polymeric precursor is itself polymeric) by polymerisation. If a polymerisable polymer is itself used as a polymer precursor of and/or used in the invention it is preferred that such a polymer precursor has a low polydispersity, more preferably is substantially monodisperse, to minimise the side reactions, number of by-products and/or polydispersity in any polymeric material formed from this polymer precursor. The polymer precursor(s) may be substantially un-reactive at normal temperatures and pressures.

The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or cross-linking with such other resins as appropriate.

Preferably the polymer precursors used in the method of the present invention to obtain copolymers of the invention comprise one or more multifunctional (meth)acrylates, especially if a mono-functional initiator is used. Suitable multi-functional (meth)acrylates may be selected from: trimethylolpropane triacrylate, trimethylolpropane trimethacrylate, pentaerythrytol triacrylate, ethoxylated and propoxylated trimethylolpropane triacrylate, glyceryl propoxylated triacrylate, pentaerythritol tetra-acrylate, ditrimethylolpropane tetra-acrylate, alkoxylated tetra-acrylates, dipentaerythritol penta-acrylate or dipentaerythritol hexa-acrylate.

Preferred star shaped acrylic copolymer of the invention comprise a shell polymer having at least three shell arms, and preferably four or more arms.

The core polymers (comprising one or plurality of core arms) have a preferred theoretical average number molecular weight ($M_n$) from about 60 to about 250 kilodaltons, more preferably from about 120 to about 200 kilodaltons.

The shell polymers (preferably comprising at least three shell arms) have a preferred $M_n$ from about 20 to about 80 kilo-daltons, more preferably from about 30 to about 60 kilodaltons.

Preferably the mass percentage of the copolymer of the invention which consists of shell polymer (calculated as the total mass of the shell polymer as a proportion of the total mass of shell polymer and core polymer) is from about 10% to about 50%, more preferably from about 15% to about 30%.

The polymer(s) which form the core arm(s) have a low $T_g$ and preferably comprise suitable polymeric moieties obtained and/or obtainable from one or more monomers (optionally substituted by one or more hydroxy and epoxy groups): $C_{1-10}$alkyl acrylates, amyl acrylates, stearyl acrylate, lauryl acrylates and/or mixtures and/or derivatives thereof.

More preferably the core arm monomers are selected from methyl acrylate, ethyl acrylate, n-propyl acrylate, isopropyl acrylate, n-butyl acrylate, tert.-butyl acrylate, sec.-butyl acrylate, isobutyl acrylate, amyl acrylate, hexyl acrylate, 2-ethylhexyl acrylate, octyl acrylate, nonyl acrylate, decyl acrylate, stearyl acrylate, lauryl acrylate and/or mixtures thereof.

The polymers which form the shell arm(s) have a high $T_g$ and preferably comprise suitable polymeric moieties obtained and/or obtainable from one or more monomers selected from (optionally substituted by one or more hydroxy and epoxy groups): $C_{1-10}$alkyl acrylates, amyl acrylates, stearyl acrylate, lauryl acrylates and/or mixtures and/or derivatives thereof:

More preferably the shell arm monomers are selected from methyl methacrylate, ethyl methacrylate, tert.-butyl acrylate, cyclohexyl methacrylate, isobornyl methacrylate and/or mixtures thereof.

In both cases, any other types of monomers such as glycidyl methacrylate, tert-butyl acrylate, tert-butyl methacrylate, hydroxy (meth)acrylates, styrene derivatives can be readily incorporated in the polymers which form the core and/or shell arm(s).

Monomers used in the present invention may comprise latent functional monomers such as t-butyl acrylate Preferably copolymers of the invention comprise core arms and shell arms which form two or more phases of a multiphase copolymer system and optionally also comprise a gradient zone at the interface between at least two of said phases. The respective ratio between amount of polymer inhabiting the core phase(s) and shell phase(s) may be measured quantitatively using atomic force microscopy (AFM), for example by visual inspection or other analysis of micro-phase images of copolymer films of the invention observed with tapping AFM. The core to shell phase ratio of polymers of the invention is optionally from about 1 to about 10, preferably about 2 to about 6.

Preferably, the copolymer is derived from acrylic monomers only i.e. is full acrylic polymer.

If tert.-butyl acrylate is used to produce either or both of the core and/or shell arms optionally after polymerization is complete the copolymer can be heated (for example at about 200° C. under vacuum) to liberate the tert.-butyl groups and leave carboxylic acrylic acid groups along the copolymer chains.

Without wishing to be bound by any mechanism it is believed that in many copolymers of the invention there is not a clear separation between the low $T_g$ polymer blocks in the core arms and the high $T_g$ polymer blocks in the shell arms. This is believed to be due to the method of the present invention where the monomers which will form the shell polymers of high $T_g$ are added to the core polymers of low $T_g$ after at least 91% to 95% (preferably >95%) of the core monomers have already been polymerized. The applicant believes that for many copolymers of the invention there is a gradient zone between the polymer blocks of low $T_g$ in the core arms and the polymer blocks of high $T_g$ in the shell arms and this is a preferred feature.

The preferred process used for synthesising the copolymers of the invention is radical polymerisation optionally transition metal catalysed, and more preferably atom transfer radical polymerization (ATRP), for example as described in Chemical Reviews, 2001, 101, 2921-2990, Matyjaszewski & Xia.

Many trifunctional or polyfunctional initiators may be used in ATRP, such as the complete condensation product of pentaerythritol and 2-bromoisobutyryl bromide, of pentaerythritol and 2-bromopropanoyl bromide. These initiators are tetrafunctional. Halogenated alkanes, benzylic halides, alpha-haloesters, alpha-haloketones, alpha-halonitriles and/or sulfonyl halides may also be used as ATRP initiators.

Preferred catalysts (and/or catalyst precursors) which may be used in the method of the present invention comprise metals, salts and/or complexes thereof; more preferably transitional metals, salts and/or complexes thereof, most preferably Cu(0), Cu(I)Br, Cu(I)Cl, Fe(II)Br, Fe(II)Cl, salts and/or complexes of Ru[II], salts and/or complexes of Ni[II] and/or suitable mixtures thereof.

As used herein the term transitional metal includes all metals in Groups 3 to 12 of the Periodic Table (including for example the noble metals, copper and zinc) and in any suitable oxidation state.

Optionally the metallic catalysts may be combined with one or more of: mono-, bi- or multi-dentate nitrogen-based ligands, polyamine ligands (preferably 2,2'-bipyridine derivatives such as N,N,N',N',N" pentamethyldiethylenetriamine) and/or phosphorous-based ligands (preferably triphenyl phosphine and/or tricyclohexyl phosphine).

In one embodiment of the method of the present invention the unpurified monomers which will form the low $T_g$ core arms are placed together with solvent (typically toluene) and reactants in a reactor. The reaction mixture is degassed by continuously bubbling nitrogen through the mixture for about 45 minutes. Polymerisation of the low $T_g$ monomers is then initiated at a typical concentration of 60% solids In the solvent. The reaction temperature is from about 90° C. to about 110° C. and the reaction is continued for 8 to 16 hours until the percentage monomer converted to polymer is at least from about 91% to 95%, preferably higher than 95%. All the monomers for the high $T_g$ shell polymers (previously degassed under the same conditions as before) are then added at the same time to the reaction mixture containing the unpurified core polymer. The second polymerization is stopped after 12 to 16 hours once the percentage conversion of the final monomers is higher than 95%. A non-solvent for the copolymer, such as an alcohol is then added to the reaction mixture. The copolymer precipitates, is collected by filtration and dried.

Alternatively, super-critical fluid extraction can be employed to remove residual monomer(s), solvent(s) and transition-metal catalyst. Dense phase $CO_2$ can be used to purify the ATRP polymers prepared using the method of the invention. Extraction of reactive component residues (acrylated/methacrylated monomers), residual solvent (toluene), extraction of transition-metal catalyst (with co-solvent present) is compatible with $CO_2$ extraction techniques.

If Cu(I) is used as catalyst, the addition of metallic copper Cu(0) (about 10% in weight relative to the Cu(I) salt) regenerates the inactive Cu(II) salts formed by the oxygen remaining in the reaction mixture into active Cu(I) salts. Adding Cu(0) brings about higher conversions of the monomers and shorter reaction times for both stages of the process although it may have a more pronounced effect during the second stage polymerisation which produces the shell polymers.

The ratio between the initiator and the monomers used to make the low and high $T_g$ polymers determines the various block lengths, and therefore also the ratio between the low $T_g$ core block polymers and high $T_g$ shell block polymers. The mole ratio between monomers and initiator is preferably from about 300 to about 1800, more preferably from about 600 to about 1200. The theoretical mole ratio between the initiator and the copper catalyst is 1:4 for a tetrafunctional initiator, although a reduced amount of copper salt may be used to give a lower mole ratio from about 1.2 to about 1.3. The theoretical mole ratio of ligand to copper is 1.

The copolymer according to the invention may be used as such, but it can also be mixed with additives such as tackifiers to form for example an adhesive formulation. Preferred amounts of tackifier, calculated on the weight of the copolymer, are from about 5 to about 150 phr, more preferably from about 25 to about 150 phr. Preferred tackifiers are selectively compatible, more preferably compatible with the soft block copolymers in the low $T_g$ core but incompatible with the hard block copolymers in the high $T_g$ shell.

Suitable tackifiers may comprise any of the following and/or mixtures thereof: hydrogenated rosin esters—such as the commercial products: Foral® 85 E (based on glycerol, mixture of di- and triesters) and Foral® 105 E (based on pentaerythritol, tri- and tetraesters), phtalate esters of hydroabietyl alcohol—such as the commercial product Cellolyn® 21 E; and/or terpene phenolics, polyterpenes, and/or hydrogenated or non-hydrogenated hydrocarbon resins—such as the commercial products Escorez® 1310, 2420 and/or 5380; Regalrez® 1018; Regalite® 1010; Piccotac® 95, 212 and/or 6095-; and/or Norsolene® S115.

Plasticizer can also be added to formulations of the present invention in an amount calculated on the weight of the copolymer, from about 5 to about 25 phr, optionally combined with tackifier(s).

Suitable plasticizers may comprise any of the following and/or mixtures thereof: hydrocarbon oils (aromatic, paraffinic, or naphtenic) such as the commercial products Edelex®945 & 956 and/or Oil8777, hydrocarbon resins, phtalates, and/or combinations thereof.

Cellolyn®21E, Foral®85 E & 105E; Piccotac®95, 212 & 6095-E Regalite®1010 and Regalrez®1018 are trademarks of Eastman Chemicals; Escorez®1310, 2420 & 5380 are trademarks of ExxonMobil; Norsolene®S115 is a trademark of Sartomer; and Edelex®945 & 956 and Oil8777 are trademarks of Shell.

The copolymers of the invention can be used in a variety of applications in the automotive, construction, medical, personal care, food and beverage, electrical (wire and cable), appliance, sports and leisure fields. They are also usable as (pressure sensitive) adhesives for tapes and labels, as sealants, coatings, sound deadening compounds, in pipeline protection, in bitumen modification, in footwear applications, in food packaging.

Further aspects of the present invention are described in the claims.

There are now described non-limiting examples to illustrate the invention. The following general methods were used, with the details for each example given in the tables.

Method For Preparing Exemplified Copolymers Using ATRP

Cupric bromide (CuBr) was added to a dry glass tube. Degassed syringes were used to add to the tube the ligand N,N,N',N',N"-pentamethyidiethylenetrlamine (PMDETA, 0.1M in toluene) and degassed monomers for the core polymer, solvent (toluene and/or dodecane) and the initiator 2-bromoisobutyrate of pentaerythritol (PEEiBr). The tube was sealed with a rubber septum and three freeze-pump-thaw cycles were performed. The tube was then immersed in an oil bath held at 90° C. by a thermostat. When the conversion of the monomers reached at least 91% to 95% (preferably more), the degassed monomers for the shell polymer were added at the same time. The reaction was left at 90° C. until sufficiently high conversion of shell monomers was attained. The copolymer was then diluted with toluene, precipitated in methanol, collected by filtration and dried under vacuum at 80° C. for a few hours.

The impure copolymer, prepared as described above contained CuBr PMDETA catalyst, aromatic solvent (toluene) and (meth)acrylate monomer. The impure copolymer was added to a Soxhlet extraction thimble and loaded into an extraction cell. A polar extraction co-solvent (methanol or water) was then added to the extraction cell by adsorption on to an inert solid. The extraction cell was placed into a conventional device, for supercritical extraction which was pressurized to 300 bar with $CO_2$ and heated to 65° C. The $CO_2$ pressure was reduced continuously in a controlled manner for several hours and the cell contents were extracted by passing the depressurised $CO_2$ through a collection tube chilled with dry ice. Testing of the contents of the collection tube for the presence of copper gave a positive result, indicating that copper had been extracted by the $CO_2$-polar co-solvent mixture. As a control an extraction performed in essentially the same manner without the addition of a polar co-solvent (water or methanol) tested negative for copper. The use of co-solvent also leads to rapid extraction of the residual monomers and solvent.

In the tables below, the quantities of reactants, the conversions, determined by gas chromatography, the reaction time of the different stages and the polydispersity are given. Polydispersity was determined by size exclusion chromatography using THF as the eluent on a column calibrate with a polystyrene standard.

The following abbreviations have been used: nBuA=n-butyl acrylate; tBuA=tert.-butyl acrylate; 2-EHA=2-ethylhexyl acrylate; HBA=hydroxy functionalized acrylate; IBMA=isobornyl methacrylate; MA=methyl acrylate; MMA=methyl methacrylate; PEEiBr=2-bromoisobutyrate of pentaerythritol; and PMDETA=N,N,N',N',N"-pentamethyl diethylene triamine. The block lengths are the theoretical molecular weight.

The data in the following tables can be used to prepare copolymers of the invention (Copolymers 1 to 10 respectively) in combination with the method previously described.

| Copolymer 1 | | | | |
|---|---|---|---|---|
| | Amounts | Conversion % | Time H | Polydispersity |
| Core block | | | | |
| nBuA | 30 ml | nBuA: 87.9 | 7 | 2.0 |
| PEEiBr | 163.6 mg | | | |
| CuBr | 128.2 mg | | | |
| PMDETA | 8.94 ml | | | |
| Toluene | 9.60 ml | | | |
| Shell block | | | | |
| MMA | 2.9 ml | MMA: 86.7 | 15.3 | 3.0 |
| IBMA | 4.1 ml | IBMA: 90.4 | | |
| | | nBuA: 96.5 | | |

| Copolymer 2 | | | | |
|---|---|---|---|---|
| | Amounts | Conversion % | Time H | Polydispersity |
| Core block | | | | |
| nBuA | 30 ml | nBuA: 91.6 | 9.4 | 2.7 |
| PEEiBr | 163.6 mg | | | |
| CuBr | 128.2 mg | | | |
| PMDETA | 8.94 ml | | | |
| Toluene | 9.60 ml | | | |
| Shell block | | | | |
| MMA | 2.9 ml | MMA: 95.5 | 16.1 | 3.7 |
| IBMA | 4.1 ml | IBMA: 92.7 | | |
| | | nBuA: 98.2 | | |

Copolymer 3

| | Amounts | Conversion % | Time H | Polydispersity |
|---|---|---|---|---|
| Core block | | | | |
| nBuA | 30 ml | nBuA: 91.2 | 10.4 | 2.4 |
| PEEiBr | 163.6 mg | | | |
| CuBr | 128.2 mg | | | |
| PMDETA | 8.94 ml | | | |
| Toluene | 9.60 ml | | | |
| Shell block | | | | |
| MMA | 2.9 ml | MMA: 87.5 | 16.2 | 4.0 |
| IBMA | 4.1 ml | IBMA: 91.3 | | |
| | | nBuA: 97.8 | | |

Copolymer 4

| | Amounts | Conversion % | Time H | Polydispersity |
|---|---|---|---|---|
| Core block | | | | |
| nBuA | 200 ml | nBuA: 99.3 | 11.0 | 2.5 |
| PEEiBr | 1,090 mg | | | |
| CuBr | 854.7 mg | | | |
| Cu(0) | 37 mg | | | |
| PMDETA | 1.24 ml | | | |
| Toluene | 122 ml | | | |
| Shell block | | | | |
| MMA | 19.1 ml | MMA: 98.2 | 14.75 | 4.2 |
| IBMA | 27.3 ml | IBMA: 94.6 | | |
| Cu(0) | 37 mg | nBuA: 99.4 | | |

Copolymer 5

| | Amounts | Conversion % | Time H | Polydispersity |
|---|---|---|---|---|
| Core block | | | | |
| 2-EHA | 30 ml | 2-EHA: 95.6 | 16.1 | 3.4 |
| MA | 16.7 ml | MA: 96.2 | | |
| PEEiBr | 163.6 mg | | | |
| CuBr | 128.2 mg | | | |
| PMDETA | 8.94 ml | | | |
| Toluene | 9.60 ml | | | |
| Shell block | | | | |
| MMA | 2.9 ml | MMA: 95.1 | 16.4 | 4.7 |
| | | 2-EHA: 99.1 | | |
| | | MA: 98.9 | | |

Copolymer 6

| | Amounts | Conversion % | Time H | Polydispersity |
|---|---|---|---|---|
| Core block | | | | |
| 2-EHA | 48 ml | 2-EHA: 99.1 | 15.8 | 3.1 |
| MA | 11.1 ml | MA: 98.9 | | |
| PEEiBr | 238.5 mg | | | |
| CuBr | 187.0 mg | | | |
| PMDETA | 13.04 ml | | | |
| Toluene | 24.4 ml | | | |
| Shell block | | | | |
| MMA | 17 ml | MMA: 98.1 | 16.5 | 4.5 |
| | | 2-EHA: 99.9 | | |
| | | MA: 100 | | |

Copolymer 7

| | Amounts | Conversion % | Time H | Polydispersity |
|---|---|---|---|---|
| Core block | | | | |
| 2-EHA | 336.2 ml | 2-EHA: 91.0 | 23.3 | 4.1 |
| MA | 133.4 ml | MA: 91.58 | | |
| PEEiBr | 1.55 g | | | |
| CuBr | 1.22 g | | | |
| PMDETA | 1.77 ml | | | |
| Toluene | 295 ml | | | |
| Shell block | | | | |
| MMA | 90.8 ml | MMA: 92.0 | 18.5 | 5.3 |
| | | 2-EHA: 97.4 | | |
| | | MA: 97.6 | | |

Copolymer 8

| | Amounts | Conversion % | Time H | Polydispersity |
|---|---|---|---|---|
| Core block | | | | |
| 2-EHA | 42 ml | 2-EHA: 91.4 | 8.53 | 3.7 |
| MA | 16.7 ml | MA: 92.1 | | |
| PEEiBr | 0.19 g | | | |
| CuBr | 0.15 g | | | |
| PMDETA | 10.6 ml | | | |
| Toluene | 25 ml | | | |
| Shell block | | | | |
| MMA | 10.2 ml | MMA: 94.8 | 14.2 | 4.2 |
| HBA | 1.0 ml | HBA: 100 | | |
| | | 2-EHA: 97.4 | | |
| | | MA: 97.9 | | |

Copolymer 9

| | Amounts | Conversion % | Time H | Polydispersity |
|---|---|---|---|---|
| Core block | | | | |
| 2-EHA | 30 ml | 2-EHA: 98.3 | 16.4 | 3.1 |
| PEEiBr | 163.6 mg | | | |
| CuBr | 128.2 mg | | | |
| PMDETA | 8.94 ml | | | |
| Toluene | 9.60 ml | | | |
| Shell block | | | | |
| MMA | 2.9 ml | 2-EHA: 99.2 | 15.6 | 4.8 |

|  | Copolymer 10 | | | |
| --- | --- | --- | --- | --- |
|  | Amounts | Conversion % | Time H | Polydispersity |
| Core block |  |  |  |  |
| 2-EHA | 42 ml | 2-EHA: 98.9 | 16.75 | 3.3 |
| MA | 16.7 ml | MA: 98.8 |  |  |
| PEEiBr | 261.0 mg |  |  |  |
| CuBr | 204.6 mg |  |  |  |
| PMDETA | 14.27 ml |  |  |  |
| Toluene | 22.8 ml |  |  |  |
| Shell block |  |  |  |  |
| MMA | 10.2 ml | MMA: 96.1 | 16.1 | 5.2 |
| tBuA | 1.2 ml | 2-EHA: 99.8 |  |  |
|  |  | MA: 100 |  |  |

Properties of the exemplified copolymers of the invention are summarised in Table 1

TABLE 1

| Copolymer. | Core block composition (wt %) | | | Block length/ kilodaltons | $T_g$ in °C. | Shell block composition (wt %) | | | | Block length | $T_g$ in °C. |
| --- | --- | --- | --- | --- | --- | --- | --- | --- | --- | --- | --- |
|  | nBuA | 2EHA | MA |  |  | MMA | IBMA | tBuA | HBA |  |  |
| 1 | 100 | — | — | 120 | −48 | 40 | 60 | — | — | 30K | 145 |
| 2 | 100 | — | — | 120 | −48 | 40 | 60 | — | — | 30K | 145 |
| 3 | 100 | — | — | 120 | −48 | 40 | 60 | — | — | 30K | 145 |
| 4 | 100 | — | — | 120 | −48 | 40 | 60 | — | — | 30K | 145 |
| 5 | — | 60 | 40 | 200 | −38 | 100 | — | — | — | 40K | 105 |
| 6 | — | 65 | 35 | 200 | −42 | 100 | — | — | — | 60K | 105 |
| 7 | — | 70 | 30 | 200 | −41 | 100 | — | — | — | 40K | 110 |
| 8 | — | 70 | 30 | 200 | −41 | 90 | — | — | 10 | 40K | 110 |
| 9 | — | 100 | — | 200 | −64 | 100 | — | — | — | 40K | 105 |
| 10 | — | 52 | 48 | 200 | −32 | 98.5 | — | 1.5 | — | 40K | 110 |

Thermal transition temperatures ($T_g$) were determined by differential scanning calorimetry using a TA Q10 instrument. In order to remove thermal memory effects, the sample (≈10 mg) was quenched after a first DSC scan. The sample were submitted to a second heating run using a 20° C./min temperature ramp for the determination of the glass transition temperatures. The experimental procedure as well as the data treatment follows the standard guidelines of ASTM 3418.

Various physical properties of the above copolymers were tested alone or blended with tackifiers in different ratios as follows.

Rheological measurements and viscosity data for the copolymers were determined over the shear rate range 1-1000 s$^{-1}$ using a Paar-Physica UDS 200 rheometer configured in a cone-and-plate geometry (plate diameter: 25 mm; cone angle: 2°; cone-plate gap: 50 µm). The measurements were conducted in isothermal conditions at various temperatures.

The adhesive properties of the copolymers were tested on samples prepared by coating a polyester substrate (of 23 µm thickness) with a thin film of the copolymers formulated with toluene as solvent The formulations were applied to the substrate using a automatic bar knife coater (Bar speed=3, Bar height=120 to 125 µm for 40% solids polymer solution) at a coat weight of 30+/−3 g/m². After application the coating was dried for 5 minutes at room temperature and then a further 3 minutes at 110° C. Finally the coating was applied to silicon coated paper by passing the coated polyester and the paper between 2 cylinders at the same pressure for each sample. The dry adhesive coatings were preconditioned for 24 hours in a conditioned room and then tested at 23° C. and 50% relative humidity.

The following adhesive formulations were tested:

Comp A

A comparative adhesive formulation was prepared from a known copolymer and the following ingredients 100 phr of the block copolymer styrene-isoprene-styrene (SIS) (available commercially from Kraton under the trade designation D1161);

125 phr of the hydrocarbon resin tackifier available commercially from Eastman under the trade mark Piccotac® 212, 25 phr of the hydrocarbon oil plasticiser available commercially from Shell under the trade mark Edelex 956; and 3 phr of the UV absorber available commercially from Ciba under the trade mark Irganox® 1010.

Comp B

Comp B denotes the prior art PSA formulation described as Example 7F on page 37 of WO/00/39233 (3M). This comprises an all-acrylic triblock copolymer produced by living anionic polymerization and of the type MMA/IOA/MMA, (IOA denotes polymer blocks formed from iso-octyl acrylate monomer). The formulation of Example 7F comprises the MMA/IOA/MMA copolymer (50% w/w) with a mixture of two tackifiers: the rosin ester available from Eastman Chemicals under the trade mark Foral® 105 (86 phr); and the hydrogenated hydrocarbon resin available from Eastman Chemicals under the trade mark Regalrez® 1018 (46 phr).

EXAMPLES 1 TO 8d

These were prepared from some or all of the following ingredients, as given in Table 2: the hydrogenated rosin ester tackifier comprising a mixture of di- and triesters of glycerol and available commercially from Eastman Chemicals under the trademark Foral® 85 E; the phtalate ester of hydroabietyl alcohol, available commercially from Eastman Chemicals under the trademark Cellolyn® 21 E; the hydrocarbon oil plasticiser available commercially from Shell under the trademark Edelex® 945; and/or the additive available commercially from Bayer under the trademark Desmodur® T81

TABLE 2

| Example | Copolymer (at 100 phr) | Foral® 85 E/ phr | Cellolyn® 21E/ phr | Edelex® 945/ phr | Desmodur® T81/% w/w |
|---|---|---|---|---|---|
| 1 | 1 | 50 | — | — | — |
| 2 | 2 | 50 | — | — | — |
| 3 | 3 | 50 | — | — | — |
| 4a | 4 | 50 | — | — | — |
| 4b | 4 | — | 100 | — | — |
| 5a | 5 | 75 | — | — | — |
| 5b | 5 | — | 125 | — | — |
| 6 | 6 | 75 | — | 5 | — |
| 7a | 7 | 25 | — | — | — |
| 7b | 7 | 50 | — | — | — |
| 7c | 7 | 75 | — | — | — |
| 7d | 7 | 100 | — | 5 | — |
| 8a | 8 | 50 | — | — | — |
| 8b | 8 | 50 | — | — | 0.05 |
| 8c | 8 | 50 | — | — | 0.1 |
| 8d | 8 | 50 | — | — | 0.5 |

The test methods used to evaluate the exemplified PSAs were industry standard tests described in FINAT (Finat Technical Guide, 4$^{th}$ edition, 1995) as follows.

Test (i)=Shear on steel, 1 inch$^2$, 1 kg, aluminium face, tested according to FTM 8; data in minutes.

Test (ii)=Shear on steel, 0.25 inch$^2$, 1 kg, PET face, tested according to FTM 8; data in minutes.

Test (iii)=Adhesion on stainless steel tested after 20 minutes according to FTM 1, data in N(25 mm)$^{-1}$.

Test (iv)=Adhesion on stainless steel tested after 24 hours according to FTM 1, data in N(25 mm)$^{-1}$.

Test (v)=Adhesion on polyethylene (PE) film after 20 minutes according to FTM 1, data in N(25 mm)$^{-1}$.

Test (vi)=Adhesion on PE film tested after 24 hours according to FTM 1, data in N(25 mm)$^{-1}$.

Test (vii)=Loop on stainless steel according to FTM 9, data in N(25 mm)$^{-1}$.

Test (viii)=Loop on PE film according to FTM 9, data in N(25 mm)$^{-1}$.

Test (ix-a)=Shear adhesion failure test (SAFT) at 0.5° C. according to FTM 5, data in Test (ix-b)=Shear adhesion failure test' (SAFT) at 0.5° C. according to FTM 5, data in minutes.

The results of these tests are given in Tables below, where the following abbreviations were used: NS=non-slip; SS:=slip stick (zipping); MT=mixed transfer; CF=cohesive failure; AT=adhesive transfer; AFS=Adhesive failure, substrate side. '—' denotes no data available or not measured.

TABLE 3

| | Example | |
|---|---|---|
| Test/units | Comp A | Comp B |
| (i) Shear Al 1 in$^2$/mins. | >10000 NS | >10000 (0.5 inch$^2$ × 1 kg) |
| (ii) Shear PET 0.25 in$^2$/mins. | — | — |
| (iii) Adh SS (20 min)/ N(25 mm)$^{-1}$ | 15.0 | 18.7 (glass, 10 min) |
| (iv) Adh SS (24 hr)/ N(25 mm)$^{-1}$ | 15.8 | — |
| (v) Adh PET (20 min)/ N(25 mm)$^{-1}$ | 8.8 | 13 (10 min) |
| (vi) Adh PET (24 hr)/ N(25 mm)$^{-1}$ | 8.5 | — |
| (vii) Loop SS/N(25 mm)$^{-1}$ | 20.7 | — |
| (viii) Loop PET/N(25 mm)$^{-1}$ | 9.1 | — |

TABLE 3-continued

| | Example | |
|---|---|---|
| Test/units | Comp A | Comp B |
| (ix-a) SAFT/° C. | 87 | — |
| (ix-b) SAFT/mins. | — | — |

TABLE 4

| | Example | | | | |
|---|---|---|---|---|---|
| Test/units | Ex 1 | Ex 2 | Ex 3 | Ex 4a | Ex 4b |
| (i)/minutes | 352 CF | 1484 CF | 430 CF | 5271 CF | 10,366 CF |
| (ii)/minutes | — | — | — | — | — |
| (iii)/N(25 mm)$^{-1}$ | 12.4 | 19.2 | 19 | 18.1 SS | 22.5 MT |
| (iv)/N(25 mm)$^{-1}$ | 14.5 | 21.3 | 21.5 AT | 21.3 | 24.9 AT |
| (v)/N(25 mm)$^{-1}$ | 8.9 | 7.7 SS | 11.4 | 8.7 | 13.1 |
| (vi)/N(25 mm)$^{-1}$ | 12.2 | 8.9 SS | 12.3 | 9.9 SS | 17 |
| (vii)/N(25 mm)$^{-1}$ | 14.3 SS | 5.0 | 14.2 SS | 10.6 SS | 18.6 SS |
| (viii)/N(25 mm)$^{-1}$ | 4.1 SS | 2.2 | 8.2 SS | 1.3 SS | 6.3 SS |
| (ix-a)/° C. | 56 CF | — | — | 52 | 52 |
| (ix-b)/minutes | — | — | — | 55 | 56. |

From Tables 3 & 4 one can compare the properties of formulated all-acrylic block copolymers of the invention derived from n-butyl acrylate; methyl methacrylate and isobornyl methacrylate monomers with a prior art reference material of formulated SIS (Comp A) and Comp B described in WO/00/39233 (3M). Comp A has high cohesion (high shear value) and good temperature resistance (high SAFT value of 87° C.).

Examples 1, 2, 3 and 4a have identical monomer components and Table 4 demonstrates the effect on the shear strength of the formulated material of the percentage of monomer conversion (polymerisation) during each step of the method of the present invention. High shear is observed with Ex 4a>Ex 3>Ex2>Ex 1.

From this data it can be seen that during the first step of a process of the present invention before monomers of higher $T_g$ are added: preferably more than about 95% of any n-butyl acrylate monomer is converted; and/or preferably more than about 94% of any isobornyl methacrylate and/or methyl acrylate monomer(s) are converted.

More preferably the final conversion n-butyl acrylate monomer in the final product is greater than 99%.

If poor monomer conversion is achieved the applicant has found poorly defined end-blocks are obtained. Without wishing to be bound by any mechanism the end blocks of a block co-polymer are believed to be responsible for the internal strength of the material due to the presence of a gradient zone between soft and hard blocks resulting from the copolymerization between unreacted nBuA and freshly added MMA and IBMA monomers. If the conversion of the monomers which form the high $T_g$ block copolymer for shell arms is less than about 91% (and/or the molecular weight of at least one of the arm(s) of the high $T_g$ shell polymer is less than that at which chain entanglements become significant—which for example for PMMA is typically >7 kilodaltons) it is believed that the lengths of the end-blocks in the shell arms are too short to form a gradient zone sufficient to reinforce the material to the desired extent. Moreover, overall $T_g$ of the thermoplastic domains is significantly reduced due to copolymerization between residual nBuA with MMA and IBMA added in the second step. Typically, this gradient zone can be detected by DSC.

The data in Table also shows that Example 4a which comprises a copolymer with well-defined end blocks exhibits good overall PSA properties, especially cohesion. Example 4a has a superior overall PSA performances to Comp A with a higher level of adhesion on both polar and non-polar substrates.

PSA properties can be further improved by modifying the amount and type of tackifier used in the formulation. For example in Example 4b which is formulated with 100 phr of Cellolyn® 21 E the shear level (Test (i)) is improved to more than 10,000 minutes. Although adhesive transfer is observed during peel on polar substrate, a very high level of adhesion on high density polyethylene substrate is attained and the cohesion is as good as with Comp A. Moreover, very high adhesion on both stainless steel (polar substrate) and polyethylene (low surface energy) is observed compared to Comp A.

Without wishing to be bound by any mechanism the applicant believes that improved SAFT values and cohesion levels may be obtained by improving the phase separation between the domains of low $T_g$ and high $T_g$, which may also allow selective compatibility with the tackifier.

To evaluate this n-butyl acrylate in the elastomeric matrix was replaced by a mixture of 2-ethylhexyl acrylate and methyl acrylate (base on their solubility parameter) and isobornyl methacrylate was removed from the hard domains. The properties of these new formulations were tested and the results are given in Table 5.

TABLE 5

| | Example | | | |
|---|---|---|---|---|
| Test/units | Comp A | Ex 5a | Ex 5b | Ex 6a |
| (i)/min | >10,000 NS | >10,000 NS | >10,000 NS | >10,000 |
| (ii)/min | — | >10,000 | 5,322 AFS | 793 AFS |
| (iii)/N(25 mm)$^{-1}$ | 15.0 | 13.2 SS | 15.9 | 12.3 |
| (iv)/N(25 mm)$^{-1}$ | 15.8 | 14.3 | 16.4 SS | 13.2 |
| (v)/N(25 mm)$^{-1}$ | 8.8 | 6.6 SS | 9.0 SS | 12.6 CT |
| (vi)/N(25 mm)$^{-1}$ | 8.5 | 10.2 SS | 10.4 SS | 11.6 |
| (vii)/N(25 mm)$^{-1}$ | 20.7 | 15.4 SS | 20.0 SS | 12.0 |
| (viii)/N(25 mm)$^{-1}$ | 9.1 | 1.6 | 4.7 | 5.4 |
| (ix-a)/° C. | 87 | 91 | 71 | 75 |
| (ix-b)/minutes | — | 137 | 96 | 104 |

The data show that cohesion (shear) can be improved when the thermoplastic shell domain comprises only Copolymers 5, 6 or 7 which were obtained from methyl methacrylate monomers only. Improvement of the phase separation of these formulations was shown by AFM images and mechanical analysis.

The literature teaches that a low polydispersity and immiscibility between segments triggers well-defined micro domain topologies (Brédas et al., Chem. Mater., 1998, 10, 4101-4014). It is therefore surprising that the applicant has nevertheless observed excellent micro-phase separation between rubbery matrices and thermoplastic micro domains for the highly polydisperse all-acrylic block copolymers of the invention.

Examples 5a and 5b based various formulations of Copolymer 5 derived from 2HEA/MA and MMA monomers show improved properties over formulations based on copolymers of nBuA, MMA, IBMA. The values of the more severe shear test (Test (ii)–1 kg×0.25 inch$^2$) confirm the high level of cohesive strength of these formulations. Improved SAFT are also shown with these systems.

Example 6 is more preferred formulation of the invention which uses Copolymer 6, a modified version of Copolymer 5 where $T_g$ in the elastomeric blocks is lowered to reduce zipping and where the length of the PMMA blocks has increased to maintain or improve cohesive strength. Addition of only 5 phr of plasticizer (Edelex 945) to the Formulation of Example 6 leads to good level of shear strength together with clean peel and loop-tack tests as otherwise slip-stick is observed during peel tests.

Examples 7a to 7d were prepared and tested in order to evaluate the influence of tackifier level on a given base polymer and this data is shown Table 6.

TABLE 6

| | Example | | | | |
|---|---|---|---|---|---|
| Test/units | Comp A | Ex 7a | Ex 7b | Ex 7c | Ex 7d |
| (i)/min | >10,000 NS | — | — | — | — |
| (ii)/min | — | 853 | 2,392 | 9,315 | >10,000 NS |
| (iii)/N(25 mm)$^{-1}$ | 15.0 | 8.4 | 11.0 | 15.7 | 19.5 |
| (iv)/N(25 mm)$^{-1}$ | 15.8 | 8.3 | 11.3 | 15.8 | 19.5 |
| (v)/N(25 mm)$^{-1}$ | 8.8 | 4.0 | 5.8 | 8.3 | 8.6 |
| (vi)/N(25 mm)$^{-1}$ | 8.5 | 4.7 | 7.6 | 11.1 | 14.0 |
| (vii)/N(25 mm)$^{-1}$ | 20.7 | 11.6 | 13.8 SS | 18.5 SS | 16.9 SS |
| (viii)/N(25 mm)$^{-1}$ | 9.1 | 4.5 | 5.0 SS | 2.1 SS | 2.3 SS |
| (ix-a)/° C. | 87 | 44 | 50 | 72 | 74.5 |
| (ix-b)/minutes | — | 38 | 50 | 94 | 99 |

It can be seen that further lowering the $T_g$ of the elastomeric domain significantly reduces the zipping effect. The data also show that adhesion to substrates which are either polar (stainless steel) or non-polar (high-density polyethylene) increases almost linearly with the level of the tackifier (Foral® 85E) added. Good adhesion values on both substrates are achieved with formulations comprising 75 to 100 phr of Foral® 85E. Observing an enhancement of shear strength (Test (ii)) with increased level of tackifier is surprising for an acrylic-based PSA.

Selective compatibility of the tackifier for the elastomeric domain in Examples 7 (especially Ex 7c & 7d) is supported by the following analysis.

TABLE 7

| Copolymer 7 (2EHA & MA)/ wt % | Tackifier (Foral® 85E)/ wt % | Experimental $T_g$ (DSC)/° C. | Theoretical $T_g$ (Fox equation)/° C. |
|---|---|---|---|
| 100 | 0 | −41 | −41 |
| 80 | 20 | −30 | −28.8 |
| 66.6 | 33.3 | −20 | −20 |
| 42.8 | 37.2 | −14 | −13.3 |
| 0 | 100 | 36 | — |

To obtain formulations with improved high temperature resistance Examples 8a to 8d were prepared. These use a copolymer of hydroxy functionalized acrylate (HBA) with MMA (Copolymer 8) so that thermoplastic domains could then be chemically cross linked with polyisocyanates. The data show linear evolution of SAFT value with amount of cross linker added

TABLE 8

| | Example | | | |
|---|---|---|---|---|
| Test/units | Ex 8a | Ex 8b | Ex 8c | Ex 8d |
| (i)/min | — | — | — | — |
| (ii)/min | >10,000 NS | >10,000 NS | >10,000 NS | >10,000 NS |
| (iii)/N(25 mm)$^{-1}$ | 12.2 | 10.6 | 10.7 | 11.4 |
| (iv)/N(25 mm)$^{-1}$ | 11.6 | 11.1 | 12.3 | 12.0 |

TABLE 8-continued

| | Example | | | |
|---|---|---|---|---|
| Test/units | Ex 8a | Ex 8b | Ex 8c | Ex 8d |
| (v)/N(25 mm)$^{-1}$ | 4.2 | 3.8 | 4.0 | 3.6 |
| (vi)/N(25 mm)$^{-1}$ | 7.2 | 5.1 | 5.1 | 5.5 |
| (vii)/N(25 mm)$^{-1}$ | 10.7 SS | 10.8 SS | 10.0 SS | 8.6 |
| (viii)/N(25 mm)$^{-1}$ | 3.1 | 2.6 | 2.3 | 1.0 |
| (ix-a)/° C. | 88 | 94 | 96 | 133 |
| (ix-b)/minutes | 126 | 138 | 140 | 220 |

This data shows that formulations with star-shaped all-acrylic block copolymers of the present invention exhibit improved adhesion and SAFT values on both polar and non-polar substrates compared to prior art formulations such as Comp A and Comp B. A further advantage of materials of the present invention is their ease of synthesis compared to materials (such as Comp B) produced by living anionic polymerization.

The all-acrylic block copolymers of the invention can be used also as compatibilising agent between two otherwise non-compatible acrylic polymers. This is shown when Copolymer 7 is formulated with two incompatible polymer Poly1 and Poly2 which form a hazy film when formulated together.

Poly1 is a high molecular weight ($M_n$ of $5.1 \times 10^4$ daltons) acrylic copolymer obtained from 2EHA, MA, AA, HBA monomers, having a low Tg of −26.5° C. and a polydispersity of 20.9.

Poly 2 is a methacrylic copolymer obtained from MMA and IBA monomers, having $M_n$ of $7.8 \times 10^3$ daltons, a high Tg of 103° C. and a polydispersity of 3.7.

AAAI denotes an aluminium acetylacetonate cross-linker

TABLE 9

| | % w/w | | | |
|---|---|---|---|---|
| Ingredient | Comp C | Ex 9a | Ex 9b | Ex 9c |
| Copolymer 7 | 0 | 10 | 10 | 10 |
| Poly 1 | 100 | 90 | 80 | 80 |
| Poly 2 | | | 10 | 10 |
| AAAI | 0.1 | 0.1 | 0.1 | 0 |

TABLE 10

| | Example | | | |
|---|---|---|---|---|
| Test/units | Comp C | Ex 9a | Ex 9b | Ex 9c |
| (i)/min | — | — | — | — |
| (ii)/min | 758 | 300 | 2543 | 121 |
| (iii)/N(25 mm)$^{-1}$ | 9.5 | 8.6 | 8.0 | 8.2 |
| (iv)/N(25 mm)$^{-1}$ | 10.6 | 10.2 | 9.4 | 9.7 |
| (v)/N(25 mm)$^{-1}$ | 3.2 | 2.7 | 4.4 | 4.7 |
| (vi)/N(25 mm)$^{-1}$ | 3.6 | 3.9 | 4.3 | 4.8 |
| (vii)/N(25 mm)$^{-1}$ | 13.5 | 12.2 | 9.5 | 8.9 |
| (viii)/N(25 mm)$^{-1}$ | 2.6 | 2.5 | 2.2 | 2.3 |
| (ix-a)/° C. | 180 | — | 250 | 100 |
| (ix-b)/minutes | — | — | — | — |

When cross-linked with AAAI, Poly 1 behaves as a PSA with modest performance. The addition of 10% of Copolymer 7 results in a perfectly compatible blend but does not greatly affect the properties of the original material, only shear is reduced. However the presence of Copolymer 7 now allows an homogeneous blend (perfectly clear film observed visually) between Poly 1 and Poly 2. Poly 2 acts as a hardener to significantly improves the cohesive strength and SAFT of Examples 9b and 9c, without significantly reducing other PSA properties. This illustrates that copolymers of the invention can act as compatibilising agents between two otherwise non compatible acrylic polymers and that blending high and low Tg (meth)acrylic polymers allows cohesive and adhesive character of a formulation to be separated when they are normally inter-related in classical acrylic PSA.

The viscosity of formulated and non-formulated co-polymers of the invention and Comp A was measured and is given below.

TABLE 11

| Viscosity (Pa · s) | Comp A | Ex 1 | Copolymer 4 | Ex 4c |
|---|---|---|---|---|
| 180° (104 s$^{-1}$) | 8.5 | 8.7 | 32.0 | 6.4 |

Table 11 shows that viscosity of a formulated full-acrylic thermoplastic elastomer of the Invention (such as Example 4c) is lower than that of Comp A.

The invention claimed is:

1. A branched copolymer comprising an acrylic copolymer comprising at least one core arm comprising at least one acrylic core polymer and at least one shell arm comprising at least one acrylic shell polymer where said acrylic copolymer is obtained by transition metal catalyzed radical polymerization and has a polydispersity of from 3 to 10, and where (a) the core polymer has a polydispersity of at least 2 and a $T_g$ of from −65° C. to −20° C., and (b) the shell polymer has a $T_g$ of from 70° C. to 160° C.;

where the branched polymer is a star shaped thermoplastic elastomer acrylic block copolymer with a number average molecular weight ($M_n$) of greater than 100 kilodaltons.

2. The copolymer as claimed in claim 1, which is substantially free of a region obtained by an amine functional ethylenically unsaturated radically polymerizable monomer.

3. The copolymer as claimed in claim 1, in which the core arms have a $M_n$ of from 60 to 250 kilodaltons, and the shell arms have an $M_n$ of from 20 to 80 kilodaltons.

4. The copolymer as claimed in claim 1, wherein the mass percentage of shell arms in the copolymer is from 10% to 50%.

5. The copolymer as claimed in claim 1, wherein the polymer precursors from which the core arms are obtained are monomers selected from the group consisting of: $C_{1-10}$ alkyl acrylates, stearyl acrylate, lauryl acrylates, mixtures thereof and derivatives thereof.

6. The copolymer as claimed in claim 5, where the monomers are selected from the group consisting of: methyl acrylate, ethyl acrylate, n-propyl acrylate, isopropyl acrylate, n-butyl acrylate, tert-butyl acrylate, sec-butyl acrylate, isobutyl acrylate, amyl acrylate, hexyl acrylate, 2-ethylhexyl acrylate, octyl acrylate, nonyl acrylate, decyl acrylate, stearyl acrylate, lauryl acrylate and mixtures thereof.

7. The copolymer as claimed in claim 1, wherein the monomers are selected from the group consisting of: methyl methacrylate, ethyl methacrylate, tert-butyl acrylate, cyclohexyl methacrylate, isobornyl methacrylate and mixtures thereof.

8. The copolymer as claimed in claim 1, wherein the core and/or shell arms further comprise polymeric moieties obtained from at least one monomer selected from the group consisting of: glycidyl methacrylate, tert-butyl (meth)acrylate, hydroxy (meth)acrylates, styrene, mixtures thereof and derivatives thereof.

9. The adhesive composition comprising a branched copolymer as claimed in any of claims 1 to 8.

10. The adhesive as claimed in claim 9, which further comprises from 5 to 150 phr of a tackifier, calculated by the weight of the copolymer.

11. The adhesive as claimed in claim 10, which comprises from 25 to 150 phr of a tackifier.

12. The adhesive as claimed in claim 9, which is selected from the group consisting of: a pressure sensitive adhesive and a hot-melt adhesive.

\* \* \* \* \*